United States Patent
Morikawa

(10) Patent No.: US 6,870,634 B1
(45) Date of Patent: Mar. 22, 2005

(54) DIGITAL IMAGE OUTPUTTING DEVICE, AND IMAGE DATA HANDLING DEVICE AND METHOD THEREOF

(75) Inventor: Takeshi Morikawa, Okazaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/388,632

(22) Filed: Sep. 1, 1999

(30) Foreign Application Priority Data

Sep. 4, 1998  (JP) .......................................... 10-251139

(51) Int. Cl.⁷ ............................................. G06F 15/00
(52) U.S. Cl. ...................... 358/1.16; 358/1.15; 358/1.17
(58) Field of Search ............................... 358/1.16, 1.17, 358/1.15, 296, 401, 404, 444, 40.3; 382/232, 233

(56) References Cited

U.S. PATENT DOCUMENTS

| | | | | |
|---|---|---|---|---|
| 4,563,706 A | * | 1/1986 | Nagashima | ................. 358/444 |
| 5,798,843 A | * | 8/1998 | Yamamoto et al. | ......... 358/404 |
| 5,877,864 A | * | 3/1999 | Sumida et al. | ............. 358/1.16 |
| 6,016,386 A | * | 1/2000 | Nosaki et al. | ............. 358/1.15 |
| 6,219,156 B1 | * | 4/2001 | Yoshida et al. | ........ 358/426.07 |

FOREIGN PATENT DOCUMENTS

JP        10-200714        7/1998

* cited by examiner

*Primary Examiner*—Twyler Lamb
(74) *Attorney, Agent, or Firm*—Morrison & Foerster LLP

(57) ABSTRACT

A digital image data and producing an image on a recording medium based on the image data is provided. The digital image outputting device detects the page-size of image data received. The image data is compressed and stored in an image memory. The stored image data is expanded within the image memory in a compressed state. The necessary capacity of the recording area is determined based on presumption of both the detected and the worst data-compressing rate. A recording area is reserved which matches the determined capacity. The image data compressed by the data compressor is stored in the reserved recording area.

25 Claims, 8 Drawing Sheets

FIG. 5(B)

| | |
|---|---|
| #20 | STATE? |
| #21 | START? |
| #22 | PAGE NUMBER ← 1 |
| #23 | DETECT PAGE-SIZE |
| #24 | DETERMINE TO-BE-SECURED MEMORY CAPACITY |
| #25 | RENEW STATE VALUE |
| #31 | MEMORY RESERVATION OK? |
| #32 | SET COMRESSING-REQUEST |
| #33 | SET PAPER-FEEDING REQUEST |
| #34 | RESERVE MEMORY |
| #41 | NEXT PAGE FOLLOW? |
| #42 | ADD PAGE NUMBER |
| #43 | DETECT PAGE-SIZE |
| #44 | STATE ← 0 |
| #51 | PAPER-FEED FOR PRECEDING PAGE FINISHED? |
| #52 | DIFFERENT-SIZE PAGES MIXED? |
| #53 | LARGER THAN ANTECEDENT PAGES IN PAGE-SIZE? |
| #54 | DOUBLE-SIDE COPYING MODE? |
| #55 | SET PAPER-FEEDING REQUEST |
| #56 | STATE ← 5 |
| #57 | DETERMINE TO-BE-SECURED MEMORY CAPACITY |
| #61 | MEMORY RESERVATION OK? |
| #71 | DATA-COMPRESSING OF PRECEDING PAGE FINISHED? |
| #72 | SET COMPRESSING-REQUEST |
| #73 | STATE ← 2 |

DIGITAL IMAGE OUTPUTTING DEVICE, AND IMAGE DATA HANDLING DEVICE AND METHOD THEREOF

This application is based on application No. 10-251139 filed in Japan, the contents of which is hereby incorporated by reference.

BACKGROUND OF THE INVENTION

1. Field of the Invention

The present invention relates to a digital image outputting device which receives image data and produces an image on a recording medium based on the image data. More particularly, the present invention relates to a digital image outputting device and an image data handling device and method thereof applicable to a device of multiple functions such as copier, facsimile and printer, wherein necessary capacity of image memory for storing input for image data temporarily is economized.

2. Description of the Prior Art

In a conventional digital image outputting device, a memory unit to store input for image data until execution of printing processing is constructed as FIG. 7, in general. The memory unit consists of bus switching section 401, image memory 402, code processing section 403, and code memory 406. The code processing section 403 includes a compressor 404 and an expandor 405.

At the memory unit shown in FIG. 7, image data coming in from signal processing section (image reading section for a copier or external equipment such as a personal computer) is temporarily stored within the image memory 402 as original data by way of the bus switching section 401. If sufficient space area is available in the code memory 406, the compressor 404 for the code processing section 403 reads-out and compresses the data and then, stores the compressed data in the code memory 406. Soon after the printing processing section gets ready, the expandor 405 for the code processing section 403 reads-out and expands the compressed data to restore the data as before compressed. The restored data is transmitted to the printing processing section through the image memory 402 and the bus switching section 401.

However, a conventional digital image outputting device including the above-described memory unit has had following problems. That is, such a digital image outputting device needs image memory 402 other than code processing section 403, whereby image outputting processing necessitates considerably large capacity of memory in total. In addition, as for case of a multiple function device composed of copier, facsimile, printer, and the like, overflow of memory sometimes occurs and productivity of image outputting processing becomes considerably worse.

SUMMARY OF THE INVENTION

The present invention is intended to solve the above-described problems of the conventional digital image outputting device. Its prime object is to provide a digital image outputting device and an image data handling device and method thereof, which dynamically secure memory capacity needed for storing compressed image data and determine start-timing of printing processing so that image outputting processing within limited memory capacity can be done productively without overflow.

In order to achieve the above objectives, the inventive image data handling device for receiving input for image data and handling the image data comprises: data compressor which compresses image data coming in; image memory which stores image data compressed by the data compressor; and memory reserving means for reserving area of the capacity which is determined based on image data size within the image memory.

Furthermore, the inventive image data handling method for receiving input for image data and handling the image data includes: a step of reserving a recording area of a capacity determined based on the image data coming in within image memory; a step of compressing the image data coming in; and a step of storing the image data compressed in the recording area reserved within the image memory.

In the present invention, a necessary capacity of recording area is dynamically secured in accordance with volume of image data coming in, thereby compressed image data can surely be stored in the recording area.

In the present invention, it is preferable that capacity needed for a recording area is determined based on the image data size and worst data-compressing rate. Thereby, any image data can be stored in a recording area regardless of contents of the image data.

Furthermore, the inventive digital image outputting device for receiving input for image data and outputting the image data to a printer to obtain an image on a recording medium includes: page-size detector for detecting page-size of image data coming in; data compressor for compressing the image data; image memory for storing the image data compressed by the data compressor; data expandor for expanding the image data stored within the image memory in a compressed state; to-be-secured capacity determining means for determining necessary capacity of recording area based on presumption of both page-size detected by the page-size detector and worst data-compressing rate; and memory reserving means for reserving the necessary capacity for the recording area within the image memory, wherein the image data compressed by the data compressor is stored in the recording area reserved by the memory reserving means.

In the digital image outputting device, when image data is input, the page-size detector detects its page-size at first. Next, the to-be-secured capacity determining means determines necessary capacity for a recording area based on the detected page-size. The worst data-compressing rate is presumed at this point. After that, the memory reserving means reserves the determined-capacity of recording area within the image memory. Then, data compressor compresses the image data and the image data in a compressed state is stored in the recording area reserved within the image memory. In producing output for the image data, the data expandor reads-out the image data stored in the image memory and then expands to restore the image data to its original state and after that, the image data is printed on a recording medium.

In order to realize the above-described processing, the memory reserving means may reserve a recording area when page-size of the first page is detected and when a recording area larger than the one reserved at the present is required for image data of a following page. The inventive digital image outputting device may further include a first start means for getting printing operation started based on image data of the first page when the memory reserving means reserves a recording area, and a second start means for getting printing operation started based on image data of the second page or the followings when it is determined that page-size of the second page or the followings is not larger than the largest one among the antecedent pages. The case that a recording area larger than the one reserved at the present is required is such that page-size larger than the largest one among the antecedent pages is detected, for example.

Thus systemized, the first start means gets printing operation started for the first page when page-size of the first-page image data is detected, necessary capacity for a recording area is determined and, the determined-capacity of recording area is reserved. In case of non-mixed mode, image data for each of following pages is compressed and stored in the recording area so far reserved and, printing operation is started one by one in order because data-size of all pages are same. A start of printing operation herein means a start of mechanical operation for printing such as a paper feed (paper means recording medium such as printing paper). The start of printing operation synchronizes with readout and expansion of compressed image data by the data expandor. Thereby, printing processing of image data for each page is made one after another.

Further, there is a case that page-size of the second page or the followings is determined as larger than the largest one among antecedent pages and subsequently, the memory reserving means reserves recording area anew. In such a case as above, the inventive image outputting device preferably further includes a third start means for getting printing operation started based on the image data of the page with larger page-size.

Since thus systemized, the to-be-secured capacity determining means determines necessary capacity for a recording area anew when one of the second page and the followings with page-size larger than the largest one among the antecedent pages is detected in a mixed mode. The capacity determined anew is, of course, larger than the one so far reserved. Accordingly, the third start means gets printing operation started for the page with the largest page-size after capacity of recording area with determined anew has been reserved. Thereby, start timing of printing operation is determined concurrently with securing recording area capacity needed for data-compressing.

The inventive digital image outputting device may further include plural units of image data receiving means and reservation-prohibiting means. In this case, when the memory reserving means has reserved recording area(s) for image data received by one of the units of data receiving means, the reservation-prohibiting means prohibits reservation of the pre-reserved recording area(s) for image data received by other units of image data receiving means.

Image data receiving means corresponds to a document reading apparatus for a copier, communication modem for a facsimile, connection terminal for connecting printer and personal computer, and the like. That is, a digital image data outputting device employing more than one unit of image data receiving means indicates a complex device. In this case, once a recording area is reserved within the image memory for image data to be received by one of the plural units of image data receiving means, the reservation prohibiting means prohibits double reservation of the already-reserved recording area, whereby recording area reservation for image data received by other image data receiving means cannot be made in the already-reserved recording area. Thereby, necessary capacity of recording area is secured without being taken away for other image data and efficient printing operation can be realized.

Furthermore, the inventive digital image data outputting device preferably includes prohibition-canceling means for canceling prohibition of recording area reservation when printing based on image data stored in the reserved recording area is finished. In this case, when printing based on a certain unit of image data is finished, the recording area reserved for the image data is released by the prohibition canceling means. Thereby, the ex-recording area is opened to reservation for other image data.

As described, the present invention provides a digital image data outputting device, and an image data handling device and method thereof, wherein memory capacity needed for storing compressed image data is dynamically secured and start timing of printing processing is determined. Thereby, image outputting processing with limited memory capacity can be made productively without accompanying overflow. The present invention is, particularly, can handle multi-application such as copying, personal computer input and facsimile input.

DESCRIPTION OF THE PREFERRED EMBODIMENTS

Figure 1:
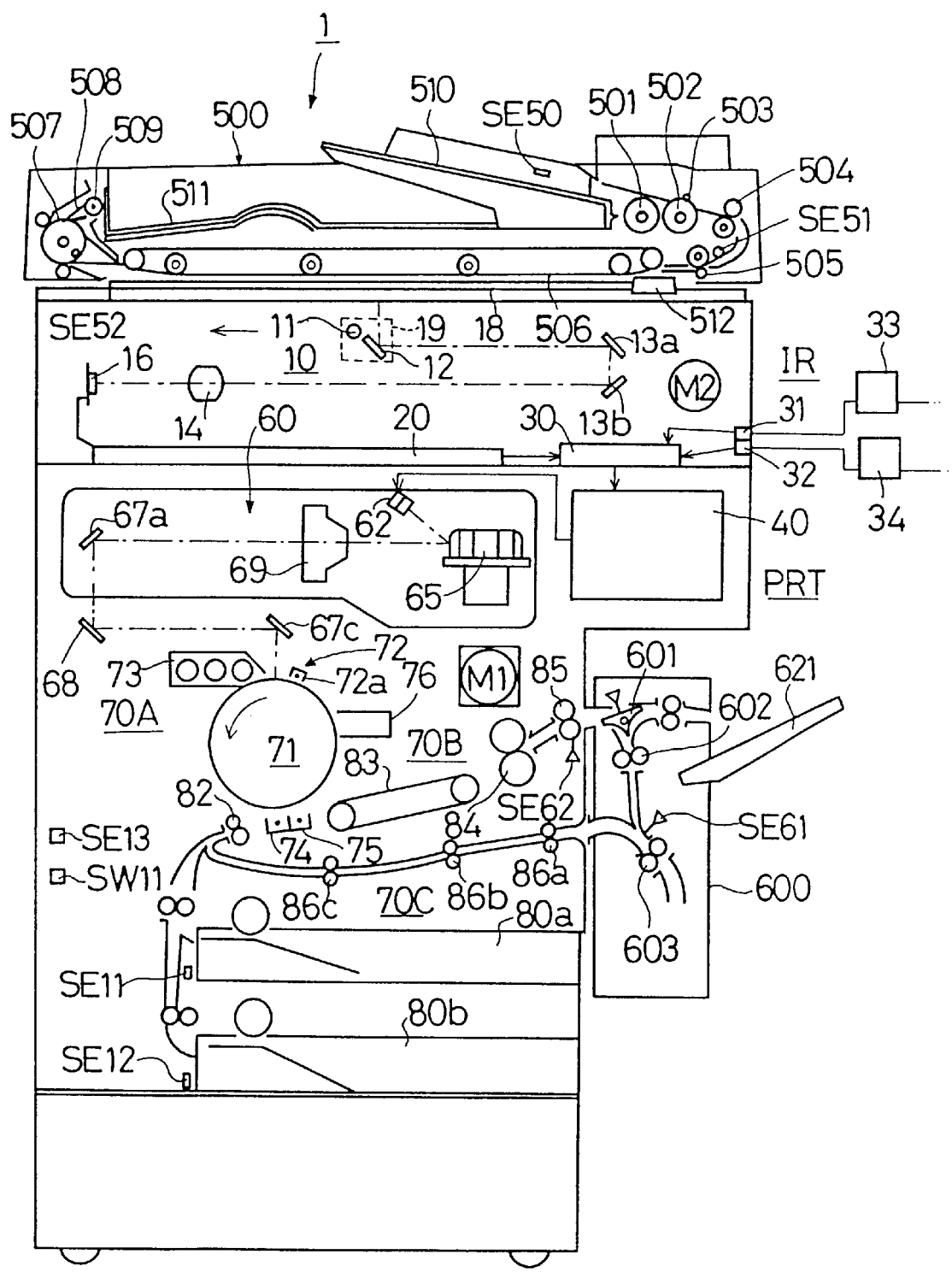
FIG. 1 is a schematic diagram of a digital copier.

The detailed aspects of a preferred embodiment of the present invention will be explained based on the drawings. The preferred embodiment relates to a multifunction type digital copier provided with connection terminals for facsimile modem and personal computer, wherein an image on a document is read, converted into digital data, and copied on printing paper. A digital copier 1 according to the present embodiment has such an entire structure as shown in FIG. 1 and includes an image reader IR and a page printer PRT.

The image reader IR includes: scanning system 10 which resolves an image on a document into pixels to read the image when the document is placed on a document glass plate 18; image-signal processing section 20 which quantizes photoelectric conversion signals produced at scanning system 10 and exercises signal processing in accordance with various image formation modes; and memory unit 30 which stores image data corresponding to a document and image data coming in from an external section. Furthermore, an automated double-side document feeder (ADFR) 500 which works as a document cover concurrently is attached on the above of the image reader IR, wherein ADFR 500 can open and close with a fulcrum of its rear end. In addition to this, the image reader IR further includes a personal computer terminal 31 for receiving image data coming in from a personal computer and a facsimile terminal 32 for receiving image data coming in from a facsimile. These external connection terminals 31 and 32 are to be connected to a personal computer and a facsimile modem, respectively, via communication control apparatuses 33 and 34 both disposed outside of the digital copier 1, thereby image data transmitted from external equipment can be received.

The scanning system 10 is a line scan type image reading device. The scanning system 10 includes: a scanner 19 having a document-irradiation lamp 11 and a mirror 12; a fixed mirrors 13a and 13b; a light-concentrating lens 14; an image sensor 16 having a CCD array; and a scan motor M2 for driving the scanner 19. A memory unit 30 will be explained later.

ADFR 500 transports a document placed on a document stacker 510 to the document glass plate 18 with the aid of a paper feeding roller 501, a delivering roller 502, a delivering pad 503, an intermediate roller 504, a resistant roller 505, and a carrying belt 506. After the document has been read, ADFR 500 ejects the document on a document ejection tray 511. This ADFR 500 includes: a document scale 512; a document detecting sensor SE50; a document-size detecting sensor SE51; and a document-ejection detecting sensor SE52. ADFR 500 further includes a reverse roller 507 which reverses top/reverse of a document and returns the document to the document glass plate 18 as reversed after the top-side of the document has been read.

The page printer PRT includes: printing processing section 40 which produces exposure control signals; a print head 60 light source of which is a semiconductor laser 62; development and transfer system 70A including a photosensitive drum 71 and its peripheral devices; fix and ejection system 70B including a pair of fixing rollers 84, a paper ejecting roller 85 and the like; circulation type paper carrying system 70C including paper re-feeding unit 600; and a drive motor Ml for driving the photosensitive drum 71. This page printer PRT is to print out a copy image of image data transferred from the image reader IR based on electrophotographic process. Below the paper carrying system 70C, there are disposed cassettes 80a and 80b capable of accommodating several-hundred sheets of printing paper, a paper-size detecting sensors SE11 and SE12, and a group of paper feeding rollers.

The print head 60 allows laser beam irradiated from the semiconductor laser 62 to scan in main scanning direction using a polygon mirror 65 and leads the laser beam to an exposure point on the photosensitive drum 71 via a main lens 69, and mirrors 67a, 68, and 67c. Around the photosensitive drum 71, there are disposed: a charger 72 for having the surface of the photosensitive drum 71 uniformly charged; developing unit 73 for forming a toner image corresponding to an electrostatic latent image formed on the surface of the photosensitive drum 71 by exposure; a timing roller 82 for delivering printing paper to a transfer point synchronizing with formation of a toner image; a toner image transfer charger 74 for transferring the toner image onto the printing paper at the transfer point; a printing paper separating charger 75 for separating the printing paper from the photosensitive drum 71 after the toner image has been transferred; a carrying belt 83 for carrying the printing paper separated from the photosensitive drum 71 to a pair of fixing rollers 84, and the like.

Paper re-feeding unit 600 is attached on a side of the page printer PRT as an additional device for automated double-side copy. In a double-side copying mode, the paper re-feeding unit 600 temporarily stocks printing paper ejected from the page printer PRT by the paper-ejecting roller 85 and makes switch-back carry to return the stocked printing paper to the main body of the page printer PRT. Accordingly, in the paper re-feeding unit 600, printing paper ejected out from the paper ejecting roller 85 is directed downward in FIG. 1 by a switching claw 601 and a carrying roller 602. When the rear end of the printing paper reaches a paper detecting sensor SE61, the printing paper is turned over by a reverse roller 603 and returned to the main body of the page printer PRT. Furthermore, the main body of the page printer PRT includes horizontal carrying roller 86a, 86b, and 86c, whereby the printing paper is directed to the photosensitive drum 71 again in a manner that the printing paper is turned over and the other side of the printing paper meets the photosensitive drum 71. In addition to it, a paper-ejecting tray 621 is attached outside the paper re-feeding unit 600.

Figure 2:
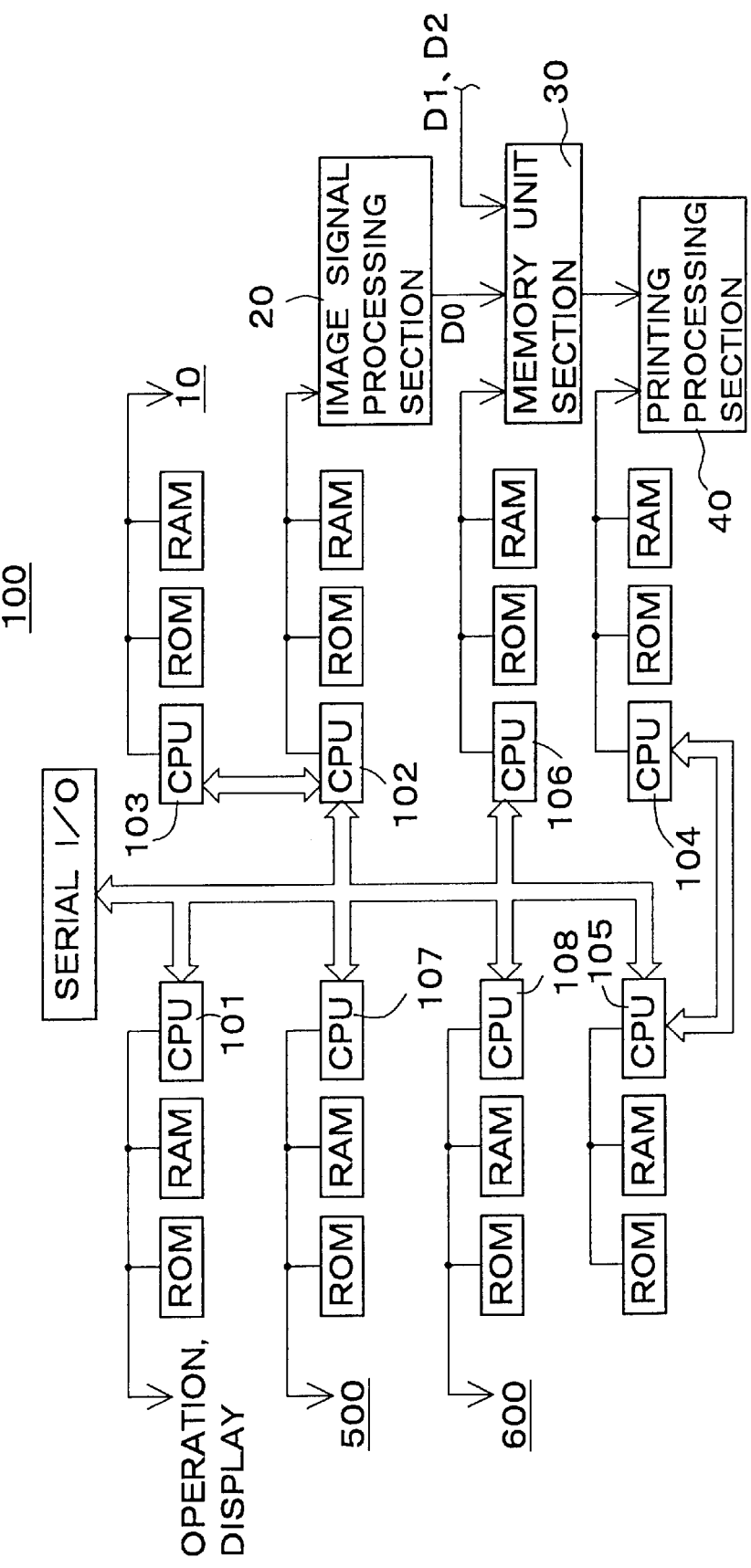
FIG. 2 is a block diagram showing entire structure of control system.

Control system 100 for the digital copier 1 mainly comprises eight CPUs 101–108, as shown in FIG. 2. A set of a ROM storing programs and a RAM as an work area of the programs is arranged for each of CPUs 101–108.

A CPU 101 receives inputs for various operations by an operator and controls display for the operator. A CPU 102 controls the image signal processing section 20. A CPU 103 controls drive of scanning system 10. A CPU 104 controls the page printer PRT entirely including the printing processing section 40. A CPU 105 controls total adjustment of timing and setting of operation mode for the control system 100. To fulfil the control, the CPU 105 receives and transmits commands and reports by serial communication for other CPUs. A CPU 106 controls storing and reading-out of image data within the memory unit 30. A CPU 107 controls the ADFR 500. A CPU 108 controls the paper re-feeding unit 600.

Figure 3:
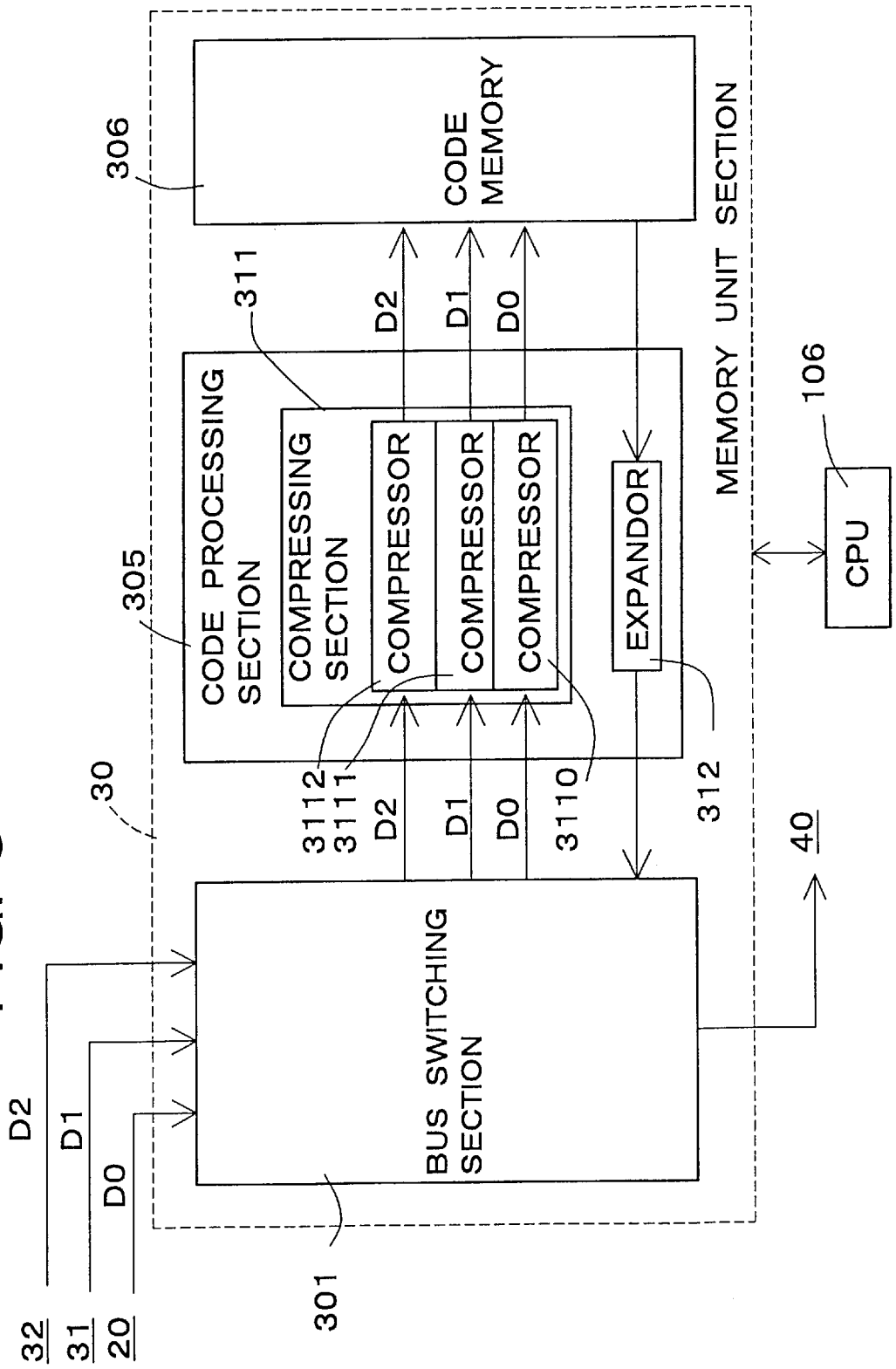
FIG. 3 is a block diagram of memory unit.

FIG. 3 shows block-structure of the memory unit 30. The memory unit 30 includes bus switching section 301, a code processing section 305 including a compressing section 311 and an expandor 312, and a multi-port type code memory 306. The memory unit 30 is in under the control of the CPU 106. The bus switching section 301 switches input for image data (D0, D1, D2) coming in from the image signal processing section 20, the personal computer terminal 31, the facsimile terminal 32, respectively, and output of the image data going out to the printing processing section 40. The cord processing section 305 compresses and expands image data and the compressing section 311 has three compressors 3110, 3111, 3112 respectively corresponding to data lines D0, D1, D2 provided for each image data entrance. The code memory 306 is a memory for temporarily storing image data compressed by the compressing section 311 until printing processing gets ready.

Next, operation of the digital copier 1 will be explained. When an operator places documents on the document stacker 510 and inputs a copy-start command, the image reader IR operates as follows. That is, for the ADFR 500 in under the control of the CPU 107, the documents placed on the document stacker 510 are carried to the document glass plate 18 one by one, wherein an image on a document is read by the scanning system 10. That is, for the scanning system 10 in under the control of the CPU 103, the document-irradiation lamp 11 emits light and concurrently, the scanner 19 moves in a main scanning direction. Thereby, image data for each pixel corresponding to the image on the document is obtained and the image sensor 16 produces outputs of the image data. A document after read by the scanning system is ejected on the document ejection tray 511. However, when in a double-side reading mode, the document is turned over by the reverse roller 507 and returned to the document glass plate 18 again as it is reversed.

In the image-signal processing section 20, the image data receives shading-correction, gamma-correction, enlargement and reduction processing, rotation processing, and other image processing in accordance with image formation modes, then the processed image data is transmitted to the memory unit 30. In the memory unit 30, image data of a document transmitted from the image-signal processing section 20 through the data line D0 is compressed by the compressor 3110 and temporarily stored in the code memory 306 in a compressed state. In case image data transmitted from a personal computer or from a facsimile modem are obtained through external terminals 31, 32 (and data lines D1, D2), those image data are similarly compressed by the compressors 3111, 3112, respectively, and temporarily stored in the code memory 306 in a compressed state.

On the other hand, for the page printer PRT, in under the control of the CPU 104, printing paper suitable for an original document in size is taken out from either cassette 80a or 80b and carried to the photosensitive drum 71. The photosensitive drum 71 is rotated and peripheral devices such as the charger 72 are driven. Next, the image data compressed and stored in the code memory 306 for the memory unit 30 is restored to its original state by the expandor 312 and then, transmitted to the printing processing section 40 synchronizing with delivery of the printing paper. Therefore, the printing processing section 40 produces an exposure control signal, thereby the print head 60 writes an electrostatic latent image on the photosensitive drum 71. The developing unit 73 forms a toner image corresponding to the electrostatic latent image and the toner image is transferred onto the printing paper. The printing paper on which the toner image transferred is fixed by a pair of fixing rollers 84 and then, ejected on the paper-ejecting tray 621 with copied-side up. However, in case of double-side copying mode, the printing paper is switched back at the paper re-feeding unit 600 at first, and again, forwarded to the photosensitive drum 71 by the horizontal carrying rollers 86a, 86b, 86c.

As to the digital copier 1 performing printing processing along with the above-described basic operations, the control routine of the control system 100 will be explained. First, the main routine shown as a flowchart in FIG. 4 will be explained. Initialization is firstly made in #1 and then, internal timer is set in #2. After input data is checked in #3, various operation modes are set in accordance with operation by an operator in #4. Next, compressing processing of input for image data transmitted from image reader IR, personal computer, and facsimile is made in #5, #6, #7, respectively. After that, printing processing is made in #8, output data is set in #9, and other miscellaneous processing is made in #10 and one cycle of the processing ends at this point. Therefore, the end of the internal timer is awaited in #11, then the routine returns to #2 and similar processing is repeated.

The compressing processing in #5, #6, #7 in the main routine will be further explained by referring to a flowchart shown in FIGS. 5(A) and 5(B). Although source of each image data differs, contents of processing here are essentially same. Accordingly, a case of compressing processing for copying in #5 will be explained as the representative of #5, #6, #7. The subroutine of #5 is state-structured. When processing enters the subroutine, state value is firstly checked and the processing is allotted to one of the values (one of the integers 0–5), in #20. That is, if allotted to state value "0", the processing goes on to #21 and similarly, if allotted to "1", "2", "3", "4" and "5", the processing goes onto #31, #41, #51, #61, #71, respectively. Then, processing goes on to successive items of processing in a row of each state value. It should be noted that state values for each of compressing processing arranged for copying, input for personal computer, and input for facsimile are independent to one another and there is no relationship among them.

(State 0)

An initial value of the state value is 0. Accordingly, every time when the power of the digital copier 1 is turned on and processing enters this subroutine for the first time, state value is always "0" and step #21 and following steps are processed. Yes/No of start requirement is determined in #21. In case an operator pushes a start button, the start requirement is determined as "Yes", other than that case, any cases are determined as "No". If determined as "No", processing gets out from this subroutine and returns to the main routine with state value "0" remaining. Therefore, no processing is substantially made until the start button is pushed. As to input for personal computer, start requirement is determined as "Yes" if printing request is transmitted from the personal computer: other than that case, any cases are determined as "No". As to input for facsimile, start requirement is determined as "Yes" if input request is transmitted from the facsimile modem: other than that case, any cases are determined as "No".

If determined as "Yes" in #21, processing goes on to #22 and "1" is substituted for "page number" which is one of the control variables thereat. Next, page-size is detected in #23. It is size (standardized sizes such as A4, B5, etc.) of a document on the document glass plate 18 that is detected in #23. That is, if an operator opens the document cover 500 and places single document on the document glass 18, the document is subject to detection. If an operator closes the document cover 500 and places documents on the document stacker 510, a document first to be carried to the document glass plate 18 when the start button is pushed is subject to detection. Although the page-size detection also detects direction of the document placed on the glass plate 18, i.e., whether it is portrait positioning or landscape positioning, the direction detection has nothing to do with this subroutine.

The page-size detection is made for determination of memory capacity to be secured at the next step. Accordingly, in case of input for personal computer and facsimile, image data volume (in byte) may be detected instead of page-size. This is applicable to #43 in state 2 to be mentioned later.

When page-size is detected, processing goes on to #24 and necessary memory capacity to be secured is determined thereat. That is, since image data read and obtained from the document is temporarily stored at the code memory 306 for the memory unit 30 in a compressed state, capacity for a recording area needed for storing image data has to be secured in the code memory 306. The necessary memory capacity is determined in accordance with a process in flowchart shown in FIG. 6. The details of the process will be explained later. When necessary memory capacity is determined, state value is renewed to "1" in #25 and processing gets out from this subroutine.

(State 1)

Processing enters this subroutine with state value 1: the processing is checked in #20 and then, allotted to #31. Whether or not memory can be reserved is determined in #31. That is, whether or not a recording area (referred to as a free area hereinafter), which is an area in the code memory 306 not reserved for other image data storing, is available exceeding the memory capacity determined in #24. If a free area available in the code memory 306 is short and cannot be reserved, processing is determined as "No" and then, gets out from the subroutine and returns to the main routine with state 1 remaining. In this case, processing is successively determined as "No" in #31 every time of re-entry as long as capacity for a free area exceeding its necessary capacity within the code memory 306 is not available.

If capacity for a free area exceeding its necessary capacity in the code memory 306 is available, it is determined as "Yes" in #31 and processing goes on to #32. Compressing-request flag is set in #32. When the compressing-request flag is set, image data of the first page begins to be compressed. Next, paper-feeding-request flag is set in #33. When the paper-feeding-request flag is set, a paper feed for the first page is started. Then, recording area is reserved within the code memory 306 and recording area reservation for other image data is prohibited at the already-reserved recording area. Thereby, recording area needed for image data storing is secured and is never taken away for other image data. Once a recording area is reserved in #34, then, state value is renewed to "2" in #25 and processing gets out from this subroutine.

(State 2)

Processing enters this subroutine with state value 2: the processing is checked in #20 and then, allotted to #41. Whether or not next page follows is determined in #41. If next page does not follow, processing goes on to #44 and gets out from this subroutine and state value is reset to "0". If next page follows, processing goes on to #42 and the page number as one of the control variables is added by "1" thereat. Next, page-size is detected in #43. It is the next page to follow that is subject to detection in #43. When page-size detection is finished, state value is renewed to "3" in #25 and processing gets out from this subroutine.

(State 3)

Processing enters this subroutine with state value 3: the processing is checked in #20 and then, allotted to #51. Whether or not printing paper has been fed for the preceding page is determined in #51. If not yet, it is determined as "No" and processing gets out from this subroutine and returns to the main routine with state value 3 remaining. In this case, processing is successively determined as "No" in #51 every time of re-entry as long as printing paper is yet to be fed for the preceding page.

If printing paper has been fed for the preceding page, it is determined as "Yes" in #51 and processing goes on to #52. Whether or not different sizes of documents are mixed is determined in #52. If mixed, whether or not page-size of the latest page is larger than the largest one among the first page thorough the preceding page is further determined in #53. If it is determined as "No" either in #52 or in #53, processing goes on to #54 whereby whether or not it is double-side copying mode is determined. If not double-side copying mode, it is determined as "No". After paper-feeding request flag is set in #55, state value is renewed to "5", in #56 and processing gets out from this subroutine.

If different page-sizes of documents are mixed and page-size of the latest page is larger than the largest one among the first page thorough the preceding page, processing goes on to #57. Incidentally, if it is determined as double-side-copying mode in #54, processing goes on to #57. Necessary memory capacity is determined anew in #57: capacity larger than the capacity reserved at the present is further needed. Details of the determination step are the same as the case of #24. When necessary memory capacity is determined, state value is renewed to "4"in #25 and processing gets out from this subroutine.

(State 4)

Processing enters this subroutine with state value 4: the processing is checked in #20 and then, allotted to #61. Whether or not memory capacity determined anew in #57 can be reserved is determined in #61. That is, in #61, it is determined whether or not a free area within the code memory 306 is larger than a subtract between the memory capacity determined in #57 and the memory capacity determined in #24. If a free area available in the code memory 306 is short and cannot be reserved, processing is determined as "No" and then, gets out from the subroutine and returns to the main routine with state value 4 remaining. In this case, processing is successively determined as "No" in #61 every time of re-entry as long as capacity for a free area exceeding its necessary capacity is not available within the code memory 306.

If capacity for a free area exceeding its necessary capacity is available within the code memory 306, it is determined as "Yes" in #61 and processing goes on to #33, whereby paper-feeding-request flag is set. Then, a recording area is reserved within the code memory 306 and reservation of a recording area for other image data is prohibited at the already-reserved recording area in #34. Thereby, a recording area needed for image data storing is secured and is never taken away for other image data. Then, state value is renewed to "5" in #25 and processing gets out from this subroutine.

(State 5)

Processing enters this subroutine with state value 5: the processing is checked in #20 and then, allotted to #71. Whether or not the image data of the preceding page has been compressed is determined in #71. If not yet, it is determined as "No" and processing gets out from this subroutine and returns to the main routine with state value 5 remaining: the compressor 3110 is in a busy state. In this case, processing is successively determined as "No" in #71 every time of re-entry as long as image data of the preceding page is being compressed and the compressor 3110 is in a busy state. If the image data of the preceding page has been compressed out, compressing-request flag is set in #72 and then, state values is renewed to "2" in #73 and processing gets out from this subroutine.

Next, to-be-secured memory capacity determination processing in #24, #57 will be explained by accompanying a flowchart in FIG. 6. Firstly, data volume for one-page is determined in #81 prior to determining to-be-secured memory capacity. This decision is made based on page-size detected in #23 or #43. Next, whether or not it is double-side copying mode is determined in #82. If double-side copying mode, it is determined as "Yes" and processing goes on to #83, and then, total data volume is obtained by multiplying data volume determined in #81 and the total number of pages together: data for all of the pages need to be stored in the code memory 306 temporarily in case of double-side copying mode. If not double-side copying mode, it is determined as "No" and processing goes on to #84 and then, data volume determined in #81 is directly regarded as the total data volume. In case of non-double-side copying mode, image data of next page is stored after the printing of the preceding page is finished and memory capacity secured for the preceding page in the code memory 306 is emptied for the next page. Accordingly, it is sufficient as long as data volume for one-page is secured. As described above, data volume to be determined depends on whether it is double-side copying mode or non-double-side copying mode.

After total data volume is determined at either #83 or #84, processing goes on to #85, wherein to-be secured memory capacity is determined. This decision is made based on total data volume decided either in #83 or in #84 and additionally, a worst data-compressing rate is presumed for the total data volume. The worst data-compressing rate is 100%. In other words, 100% means a case that data volume of an original image data is equal to that of the compressed data. Even if the original data cannot be compressed at all, memory will not be short as long as 100% of data volume is secured.

Figure 4:
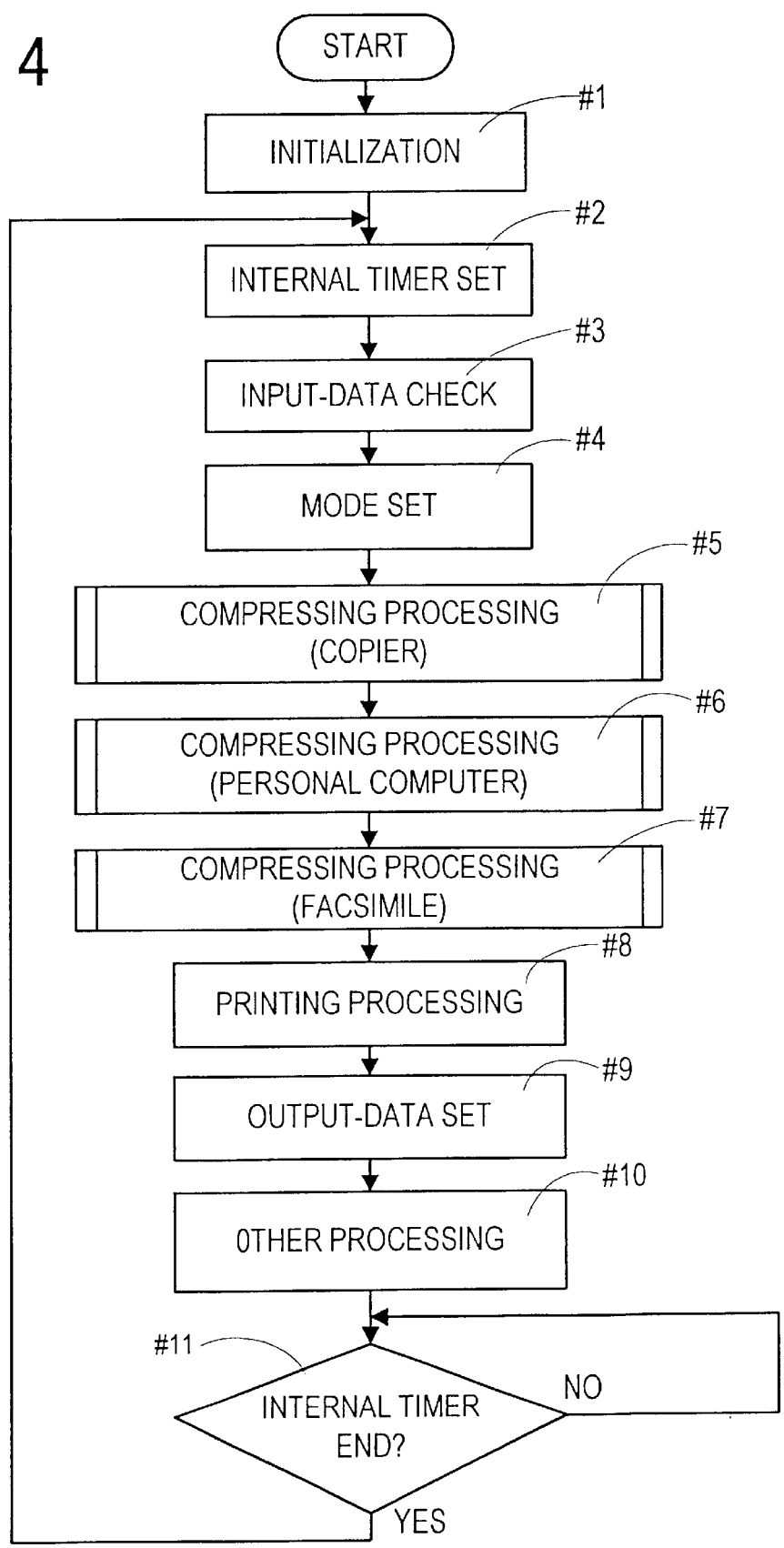
FIG. 4 is a flowchart showing main routine of control for inventive digital copier.
Figure 5:
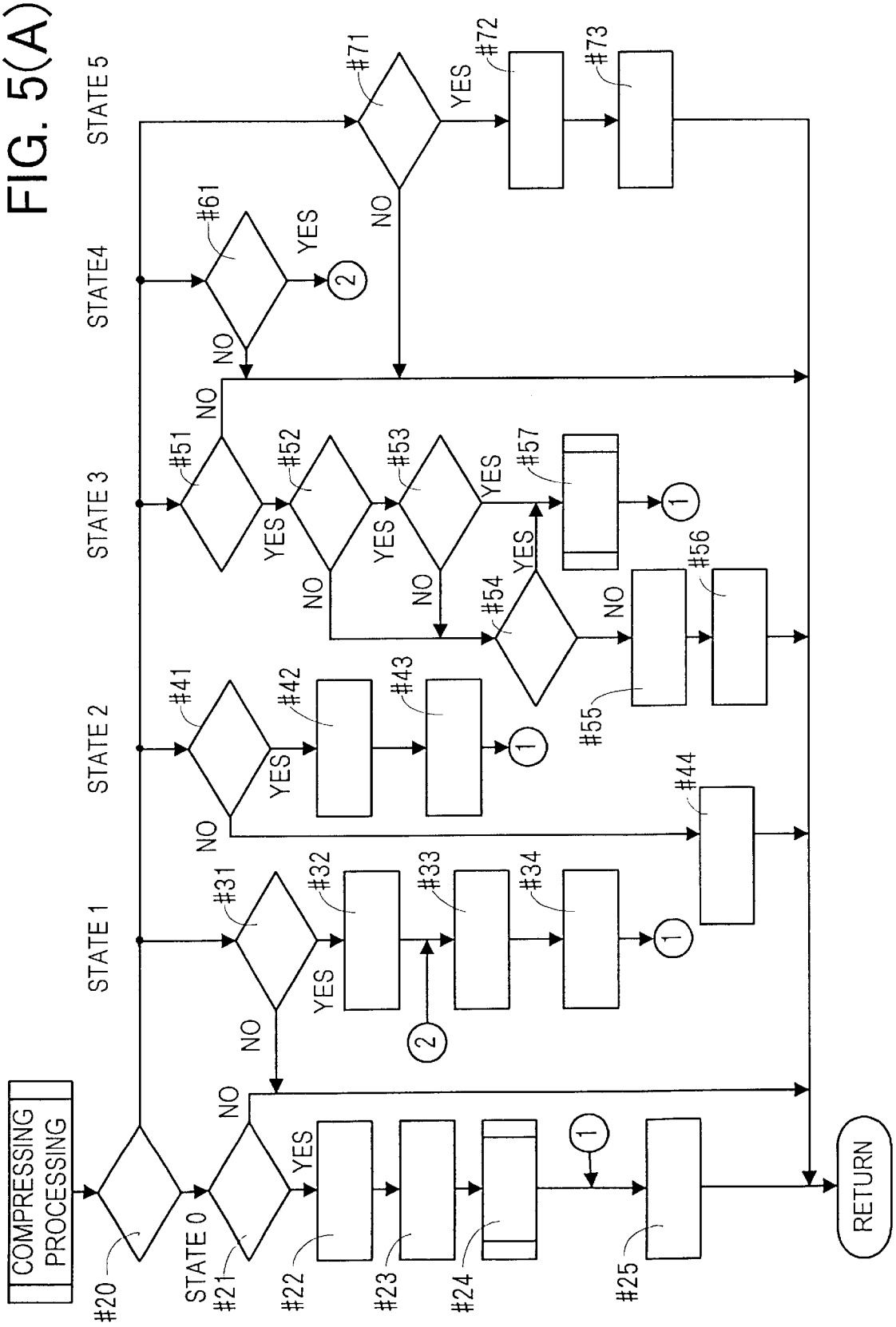
FIG. 5(A) is a flowchart showing control routine of image-data compressing processing.
FIG. 5(B) is a list of processing items for FIG. 5(A)
Figure 6:
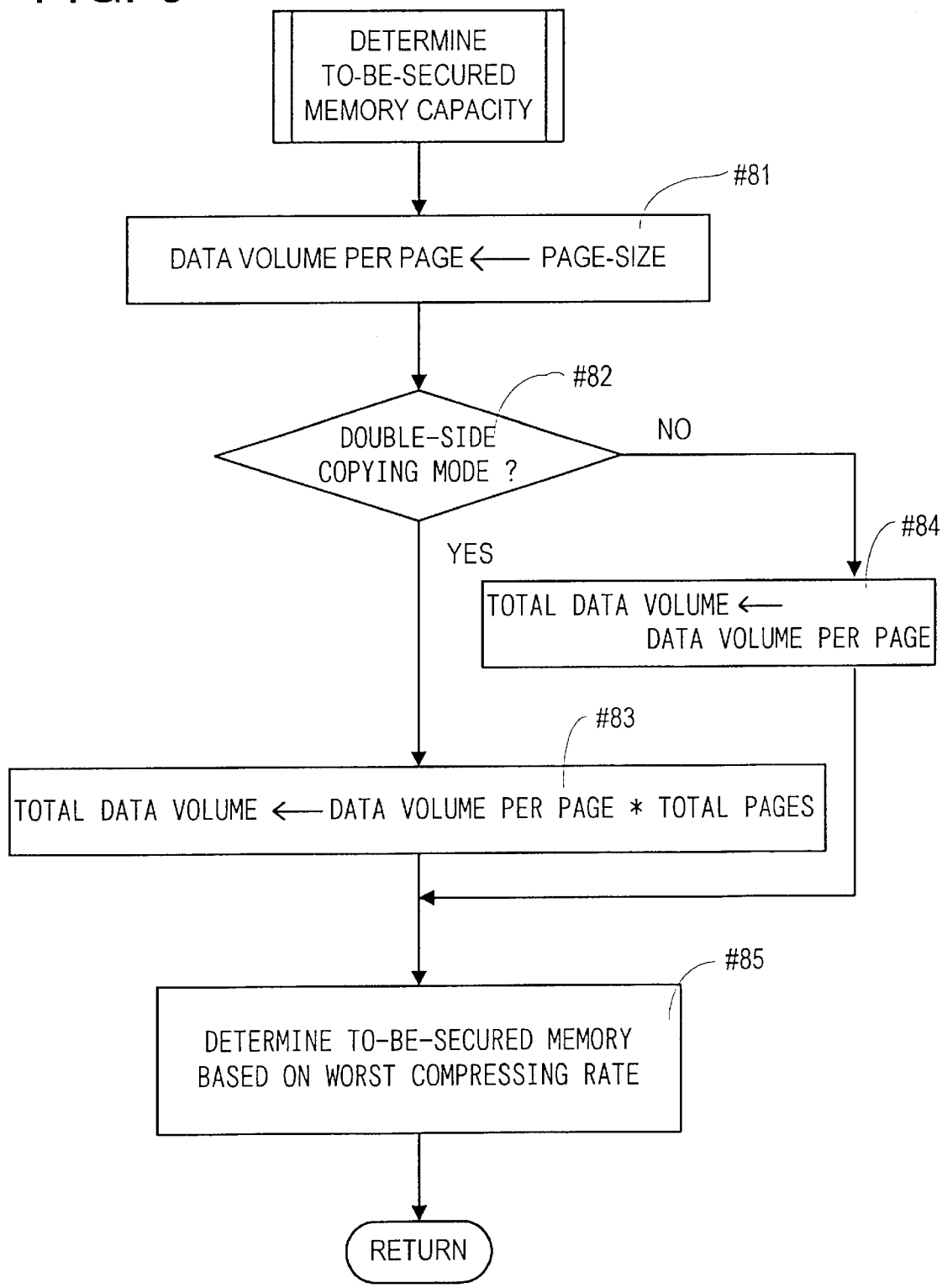
FIG. 6 is a flowchart showing routine for determining to-be-secured memory capacity.
Figure 7:
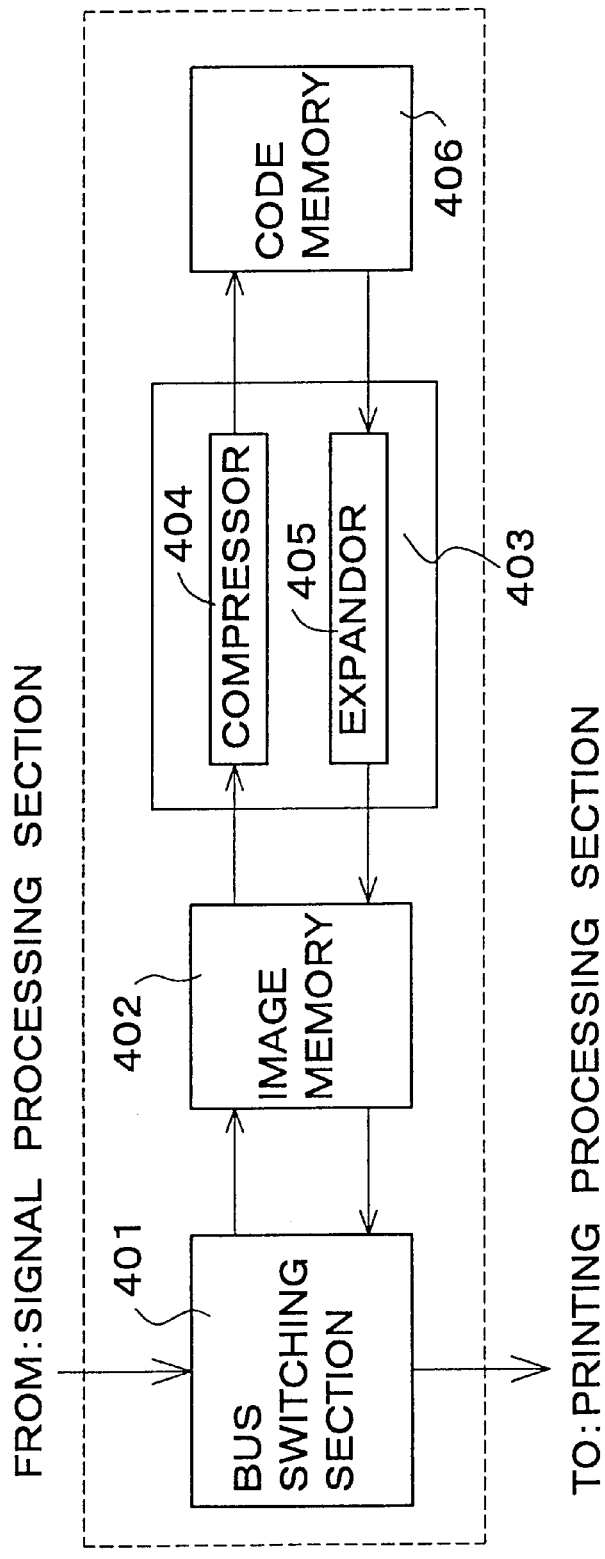
FIG. 7 is a block diagram showing memory unit of conventional digital copier.

When an operator places document s on the document stacker 510 and inputs copy start command for the digital copier 1, control pursuant to the routines in FIGS. 4–6 is executed as below. Firstly, the first document is carried onto the document glass plate 18 and an image on the document is read there. Next, processing enters compressing processing routine in FIG. 5 when the processing reaches #5 for the main routine shown in FIG. 4. State value is "0" at this point and therefore, step #21 and following steps are processed. That is, the page number is set to "1" in #22, page size of the document is detected in #23 and then, to-be-secured memory capacity is determined in #24. As described above, the worst data-compressing rate is presumed when the decision is made. After that, state value is renew to "1" in #25 and processing returns to the main flowchart.

The processing reaches #5 for the main flowchart again in the next cycle, step #31 and following steps are processed because the state value is "1". That is, whether or not the memory capacity determined in #24 in the preceding cycle can be reserved is determined in #31. In case capacity in the code memory 306 is reserved for other image data (image data for other copying, personal computer, and facsimile not-yet output to a printer) and capacity remaining without being reserved is short, it is determined as "No" and processing returns to the main flowchart with state value "1" remaining. In this case, printing processing for other image data is executed in #8 in the main flowchart at first hand. Once printing processing for the other image data is finished, memory capacity used for the other image data in the code memory 306 is released. Accordingly, there is a possibility that it is determined as "Yes" in #31 when the processing reaches #5 in the main flowchart again in the next cycle.

If sufficient free capacity in the code memory 306 is available, compressing request and paper-feeding request are set and necessary memory is reserved in #32 through #34. Once the necessary memory is reserved, memory reservation for other image data is prohibited at the area of memory already reserved. Then, state value is renewed to "2" in #25 and processing returns to the main flowchart. In a posterior cycle of processing in #8 in the main flowchart, data is compressed by the compressor 3110 and a paper feed is started. This is because compressing request and paper-feeding request have been set in #32 and #33, respectively. At this point, an area for storing the compressed data is never short since memory capacity is reserved wherein the worst data compressing rate is presumed.

When processing reaches #5 for the main flowchart again in the next cycle, step #41 and following steps are processed since state value is "2". That is, whether or not next page follows is determined in #41. If it is single document and one-side reading mode, it is determined as "No" and state value is reset to "0" in #44 and then, processing returns to the main flowchart. If printing processing in #8 is finished in a posterior cycle of the main flowchart, memory capacity reserved in #34 in the antecedent cycles is released, whereby memory capacity for other image data can be reserved.

If there are plural documents or it is double-side reading mode, it is determined as "Yes" in #41. This case means either that the next document is being carried from the document stacker 510 to the document glass plate 18 or that a document on the document glass plate 18 was turned over by the reverse roller 507 and returned onto the document glass plate 18 with its bottom-side up. After the image on the document is read in #41, page number is added by "1" in #42 and then, its page-size is detected in #43. After that, state value is renewed to "3" in #25 and processing returns to the main flowchart.

When processing reaches #5 for the main flowchart again in the next cycle, items following #51 are processed since state value is "3". That is, whether or not printing paper has been fed for the preceding page is determined in #51. If not yet, it is determined as "No" and processing returns to the main flowchart with state value "3" remaining. In this case, since the paper-feeding operation is continued in #8 in the main flowchart, there is a possibility that it is determined as "Yes" in #51 when the processing reaches #5 for the main flowchart again in the next cycle.

If printing paper has already been fed, determinations in #52 through #54 are made successively and then, next processing to go differs depending on whether or not additional memory reservation is needed. In case that different-size documents are mixed and the latest page is larger than any antecedent pages in size (determined as "Yes" in both #52 and #53), an area within the code memory 36 needs to be reserved additionally based on the page-size of the latest one. Further, if it is determined as double-side copying mode in #54, an area needs to be reserved additionally so as to store the image data of the latest page therein. Accordingly, for the above cases, to-be-secured memory capacity is determined anew in #57, state value is renewed to "4" in #25 and then, processing returns to the main flowchart. On the other hand, if additional reservation is not needed ("No" in #54), paper-feeding request is set in #55, state value is renewed to "5" in #56 and then, processing returns to the main flowchart. In a posterior cycle of processing in #8 for the main flowchart, printing processing is started. This is because paper-feeding request is set in #55.

When processing reaches #5 for the main flowchart again in the next cycle, step #61 and following steps are processed if state value is "4". That is, in #61, it is determined whether or not the memory capacity based on to-be-secured memory capacity determined anew in #57 in the preceding cycle can be reserved additionally. If a free area within the code memory 306 is short and additional reservation cannot be made, it is determined as "No" and processing returns to the main flowchart with state value "4", remaining. In this case, printing processing in #8 in the main flowchart is executed for the other image data remaining within the memory code 306. Once the printing processing is finished, the memory area used for the other image data is released. Accordingly, there is a possibility that it is determined as "Yes" in #61 when the processing reaches #5 for the main flowchart again in the next cycle.

If sufficient free area is available within the code memory 306, paper-feeding request is set and memory is additionally reserved in #33 and #34. That is, in case necessary memory capacity increases, the necessary memory capacity is dynamically secured to cope with the increase of data volume. Then, state value is renewed to "5", in #25 and processing returns to the main flowchart. In a posterior cycle of processing in #8 for the main flowchart, a paper feed is started. This is because paper-feeding request is set in #33.

When processing reaches #5 for the main flowchart with state value "5", step #71 and following steps are processed. That is, whether or not image data of the preceding page has been compressed is determined in #71. If not yet, it is determined as "No" and processing returns to the main flowchart with state value "5" remaining. This is because the compressor 3110 cannot compress more than one unit of image data simultaneously. In this case, compressing of image data for the preceding page is continued in #8 in the main flowchart. Accordingly, there is a possibility that it is determined as "Yes" in #71 after the processing reaches #5 for the main flowchart again in the next cycle.

If image data of the preceding page has been completed, compressing request is set in #72, state value is renewed to "2" in #73 and then, processing returns to the main flowchart. In a posterior cycle of processing in #8 for the main flowchart, the compressor 3110 compresses image data of the latest page. This is because compressing request is set in #72.

Since state value is "2", whether or not next page follows is determined again after processing reaches #5 for the main flowchart again in the next cycle. Thus, the aforementioned items of processing are repeated for each page until image data for the last page is read and "No" determination is made in #41. Further, the above-described items of processing are made for input for data from personal computer (in #6), from facsimile (in #7), as well as input for image data of a document on the document glass plate 18 (in #5, FIG. 4).

As described in the foregoing, the digital copier 1 according to the present embodiment employs the compressing section 311 within the memory unit 30 provided with three compressors 3110, 3111, and 3112 for compressing copy data, input for personal computer and facsimile, respectively. Moreover, to-be-secured memory capacity is determined with presumption of the worst data compressing rate and then, the determined memory capacity is reserved within the memory code 306 in advance to avoid memory capacity reservation for other image data when the digital copier 1 operates to take a copy of a document placed on the document stacker 510. When reservation of memory capacity for image data of the first page is finished, a paper feed for the first page is started in #33 with state value "1". If additional memory capacity reservation for the second page and the followings is not necessary, a paper feed for the second page or the followings gets started in #55 with state value 3. Thereby, for example, as long as different-size documents are not mixed and concurrently it is one-side copying mode, even if it is an image needs to be compressed with the worst compressing rate, the next page can be read when copying of the preceding page is finished. Accordingly, any image data to be temporarily stored in the code memory 306 do not exceed the reserved memory capacity and thereby, efficient copy operation is realized.

Even if different-size documents are mixed, a paper feed for a new page gets started immediately in #55 with state value "3" as long as the new page is not larger than antecedent pages in size. Accordingly, similar to the case of non-mixed copying mode, even if an image for the latest page is an image to be compressed with the worst compressing rate, the next page can be read once copying of the preceding page is finished. Accordingly, any image data to be temporarily stored in the code memory 306 do not exceed the reserved memory capacity and thereby, efficient copy operation is realized.

If much larger capacity of recording area is needed, for example in a case that page-size of a new page is larger than that of any antecedent pages in mixed-mode, to-be-secured memory capacity is determined anew and a paper feed for the latest page is started in #33 with state value "4" when the additional reservation is made. Accordingly, a recording area needed for storing image data is dynamically secured within the code memory 306 and thereby, efficient copy operation is realized.

Also, in case of double-side copying mode, to-be-secured memory capacity is determined based on the total number of pages. Since a paper feed is started in #33 with state value "1" when the memory reservation is made, smooth printing processing can be made, necessary memory capacity is never taken away for other image data derived from other applications (input for personal computer or facsimile) and thereby, smooth printing processing is realized.

Thus, to-be-secured memory capacity differs in accordance with operation mode. Also, a recording area once secured is released for other image data after printing processing for the present image data is finished. Thereby, the code memory 306 does not have to be considerably large in total capacity. Furthermore, the memory unit 30 does not need a memory buffer regardless of the matter of memory capacity for the code memory. Accordingly, recording area needed for storing image data is always secured within the code memory 306 dynamically when printing for copy is processed. Thereby, efficient copy operation is realized.

The present embodiment is only an example and does not limit the present invention in any respect. Accordingly, the present invention can be variously improved and changed within the scope not departing the subject matter thereof. For example, inputs by external equipment are transmitted from single personal computer and facsimile in the present embodiment, however, inputs may be transmitted by more of them. Alternatively, the inventive device may be provided with many personal computer input ports without copying function.

What is claimed is:

1. A digital image outputting device for receiving image data and producing an image on a recording medium based on the image data, the digital image outputting device including:
    a page-size detector for detecting page-size of image data coming in;
    a data compressor for compressing the image data;
    an image memory for storing the image data compressed by the data compressor;
    a data expandor for expanding the image data stored within the image memory in a compressed state;
    a to-be-secured capacity determining unit for determining necessary recording area within image memory based on presumption of both page-size detected by the page-size detector and worst data-compressing rate; and
    a memory reserving unit for reserving a recording area of the capacity determined by the to-be-secured capacity determining unit within the image memory,
    wherein the image data compressed by the data compressor is stored in the recording area reserved by the memory reserving unit.

2. A digital image outputting device according to claim 1, wherein capacity of recording area determined by the to-be-secured capacity determining unit differs depending on whether of all the page-size of pluralities of image data are same (non-mixed mode) or different page-size of image data is mixed in pluralities of image data (mixed mode).

3. A digital image outputting device according to claim 2, wherein the memory reserving unit reserves a recording area when page-size of a first page is detected and when a recording area larger than a recording area reserved at the present is needed for image data for a following page, wherein the image data outputting device further including:
    a first start unit for getting printing operation started based on image data for the first page when the memory reserving unit reserves a recording area based on the page-size of the first page; and
    a second start unit for getting printing operation started based on image data of a second page and its followings when page-size of the page is determined as not larger than a largest page-size among antecedent pages.

4. A digital image outputting device according to claim 3 further comprising a third start unit for getting printing operation started, the third start unit starting based on image data for a second page and its followings when page-size of the page is determined as larger than a largest page-size among antecedent pages and the memory reserving unit reserves a recording area of additional capacity anew.

5. A digital image outputting device according to claim 1 further comprising a copying-mode determining unit for determining whether image formation on a recording medium is made on one side (one-side mode) or on both sides (double-side mode), wherein the to-be-secured capacity determining unit determines capacity of recording area in accordance with copying-mode.

6. A digital image outputting device according to claim 5, wherein the to-be-secured capacity determining unit determines capacity for a recording area needed for storing one-page of image data in case of one-side mode.

7. A digital image outputting device according to claim 5,
wherein the to-be-secured capacity determining unit determines capacity for a recording area needed for storing all pages included in image data in case of double-side mode.

8. A digital image outputting device according to claim 1 further comprising:
a more than one unit of image data receiving unit; and
a reservation-prohibiting unit for prohibiting reservation of already-reserved recording area for image data received by another image data receiving unit when the memory reserving unit has reserved a recording area within the image memory based on image data sent from one of the image data receiving units.

9. A digital image outputting device according to claim 8,
further comprising a prohibition-canceling unit for canceling prohibition of recording area reservation when printing based on image data stored in the reserved recording area has been finished.

10. An image data handling device for receiving image data and handling the image data comprising:
a data compressor which compresses image data coming in;
an image memory which stores image data compressed by the data compressor; and
a memory reserving unit for reserving a recording area of a capacity which is determined based on image data size within the image memory.

11. An image data handling device according to claim 10, wherein the memory reserving unit determines capacity needed for a recording area based on the image data size and worst data-compressing rate.

12. An image data handling device according to claim 10, wherein
image data size corresponds to volume of the image data.

13. An image data handling device according to claim 10, wherein image data size corresponds to page-size of the image data.

14. An image data handling device according to claim 10, further comprising a data expandor which expands the image data stored within the image memory in a compressed state for printing processing.

15. An image data handling device according to claim 10, further comprising a image data receiving unit for receiving image data sent from more than one data source.

16. An image data handling device according to claim 15, further comprising a reservation-prohibiting unit for prohibiting reservation of already-reserved recording area for image data received from other data source when the memory reserving unit has reserved a recording area within the image memory based on image data sent from a certain data source.

17. Image data handling method for receiving image data and handling the image data comprising:
reserving a recording area of a capacity determined based on an image data coming in within an image memory;
compressing the image data coming in; and
storing the image data compressed in the recording area reserved within the image memory.

18. Image data handling method according to claim 17, wherein capacity needed for a recording area is determined based on the image data size and worst data-compressing rate.

19. Image data handling method according to claim 18, wherein volume of image data is used to indicate the image data size.

20. Image data handling method according to claim 18, wherein page-size of image data is used to indicate the image data size.

21. Image data handling method according to claim 17, further comprising expanding the image data stored within the image memory in a compressed state for printing processing.

22. Image data handling method according to claim 17, further comprising receiving image data sent from one of more than one data source.

23. Image data handling method according to claim 22, further comprising a step of prohibiting reservation of already-reserved recording area for image data sent from other data source when a recording area has been reserved within the image memory based on image data sent from a certain data source.

24. Image data handling method according to claim 17, wherein capacity needed for a recording area is determined based on volume of image data.

25. Image data handling method according to claim 17, wherein capacity needed for a recording area is determined based on page size of image data.

* * * * *

UNITED STATES PATENT AND TRADEMARK OFFICE
CERTIFICATE OF CORRECTION

PATENT NO.        : 6,870,634 B1
APPLICATION NO. : 09/388632
DATED             : March 22, 2005
INVENTOR(S)       : Takeshi Morikawa It is certified that error appears in the above-identified patent and that said Letters Patent is hereby corrected as shown below:

In Claim 17, column 16, line 21 after the word "data" insert the word -- size --

Signed and Sealed this

First Day of May, 2007

JON W. DUDAS
*Director of the United States Patent and Trademark Office*